United States Patent
Kini et al.

(10) Patent No.: US 9,525,622 B2
(45) Date of Patent: Dec. 20, 2016

(54) LABEL STACK ENCODING AND PROCESSING TO ENABLE OAM PROCEDURES FOR SERVICE SEGMENTS IN SEGMENT ROUTED (SR) NETWORKS

(71) Applicant: Telefonaktiebolaget L M Ericsson (publ), Stockholm (SE)

(72) Inventors: Sriganesh Kini, Fremont, CA (US); Andrew Wilkinson, San Francisco, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 166 days.

(21) Appl. No.: 14/460,935

(22) Filed: Aug. 15, 2014

(65) Prior Publication Data
US 2015/0263940 A1    Sep. 17, 2015

Related U.S. Application Data

(60) Provisional application No. 61/954,334, filed on Mar. 17, 2014.

(51) Int. Cl.
  *H04L 12/723* (2013.01)
  *H04L 12/26* (2006.01)
  *H04L 12/70* (2013.01)

(52) U.S. Cl.
  CPC .............. *H04L 45/50* (2013.01); *H04L 43/00* (2013.01); *H04L 45/507* (2013.01); *H04L 2012/5625* (2013.01)

(58) Field of Classification Search
  CPC ........ H04L 43/00; H04L 45/50; H04L 45/507; H04L 2012/5625
  See application file for complete search history.

(56) References Cited

U.S. PATENT DOCUMENTS 8,804,736 B1 *  8/2014  Drake ................... H04L 12/462
                                                    370/392
9,083,602 B2 *  7/2015  Endo ................... H04L 43/0811
(Continued)

FOREIGN PATENT DOCUMENTS

EP       1926262 A1    5/2008

OTHER PUBLICATIONS

Andersson, et al., "Multiprotocol Label Switching (MPLS) Label Stack Entry: "EXP" Field Renamed to "Traffic Class" Field", *Network Working Group Request for Comments: 5462*, (Feb. 2009), 9 pages.

(Continued)

*Primary Examiner* — Alex Skripnikov
(74) *Attorney, Agent, or Firm* — Patent Portfolio Builders, PLLC

(57) ABSTRACT

Exemplary methods for creating label stacks include creating and sending a first SR label stack for a data packet, wherein the first SR label stack causes the data packet to be forwarded through the SR network using a first set of links, and wherein the first SR label stack includes a first service label that identifies a first service to be applied to the data packet by a second network device. In one embodiment, the methods include creating and sending a second SR label stack for an operations administration and maintenance (OAM) packet, wherein the second SR label stack causes the OAM packet to be forwarded through the SR network using the first set of links, and wherein the second SR label stack prevents the second network device from applying the first service to the OAM packet.

24 Claims, 17 Drawing Sheets

(56) References Cited

U.S. PATENT DOCUMENTS

| | | | | |
|---|---|---|---|---|
| 9,178,810 | B1* | 11/2015 | Singh | H04L 45/50 |
| 2014/0112124 | A1* | 4/2014 | Sivabalan | H04L 45/22 370/228 |
| 2014/0177638 | A1* | 6/2014 | Bragg | H04L 45/50 370/395.5 |
| 2015/0003231 | A1* | 1/2015 | Chen | H04L 45/22 370/221 |
| 2016/0080269 | A1* | 3/2016 | Akiya | H04L 47/125 370/229 |

OTHER PUBLICATIONS

Bradner, S., "RFC 2119 (rfc2119): Key Words for use in RFCs to Indicate Requirement Levels", (Mar. 1997), 3 pages.
Filsfils, et al., "Segment Routing Architecture", *draft-filsfils-rtgwg-segment-routing-01, Network Working Group, Internet-Draft, Internet Engineering Task Force (IETF)*, (Oct. 21, 2013), 28 pages.
Hopps, C., "Analysis of an Equal-Cost Multi-Path Algorithm", *Network Workinq Group, Request for Comments: 2992, The Internet Society*, (Nov. 2000), 8 pages.
Kompella, et al., "Allocating and Retiring Special Purpose MPLS Labels", *draft-ietf-mpls-special-purpose-labels-05, Network Working Group, Internet-Draft*, (Feb. 14, 2014), 13 pages
Kumar, et al., "OAM Requirements for Segment Routing Network", *draft-kumar-spring-sr-oam-requirement-00, Internet-Draft, Internet Engineering Task Force (IETF)*, (Feb. 14, 2014), 6 pages.
Rescorla, et al., "Guidelines for Writing RFC Text on Security Considerations", *Network Working Group Request for Comments: 3552, The Internet Society*, (Jul. 2003), 44 pages.
Rosen, E., et al., "MPLS Label Stack Encoding", *Network Working Group, Request for Comments: 3032, The Internet Society*, (Jan. 2001), 23 pages.
Rosen, E., et al., "Multiprotocol Label Switching Architecture", *Standards Track*, http://www.ietf.org/rfc/rfc3031.txt., (Jan. 2001), 61 pages.
Thaler, et al., "Multipath Issues in Unicast and Multicast Next-Hop Selection", *Network Working Group, Request for Comments: 2991, The Internet Society*, (Nov. 2000), 9 pages.

* cited by examiner

```
Action at ingress for OAM packet
For (i=0; i < TotalLabel_2b_pushed; i++) {
    /* push label */
    if (label.type == ServiceLabel) {
        if (reservedlabel_tobe_usedforGPI == True)
            push GPI;
        if (specialpurposelabel_tobe_usedforGPI == True)
            { push XL; push ESPL-GPI; }
```

Portion 401

```
Actions when label lookup results in a GPI:
pop label;
/* LabelStackEntry now points the top of stack which is the
   label below GPI */
/* Perform validity checks on LabelStackEntry */
pop LabelStackEntry; /* Action related to that label is not
                        performed */
/* Continue original label stack processing */
```

Portion 402

FIG. 4

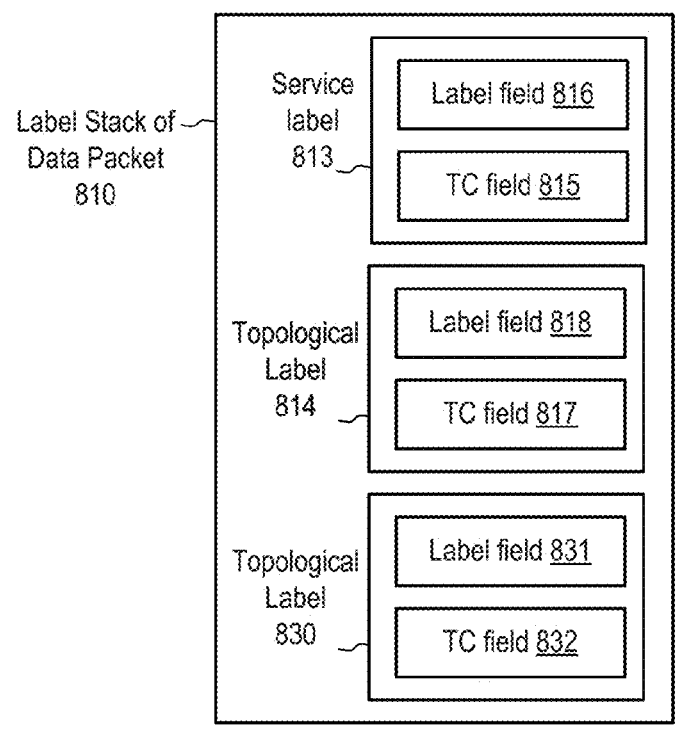
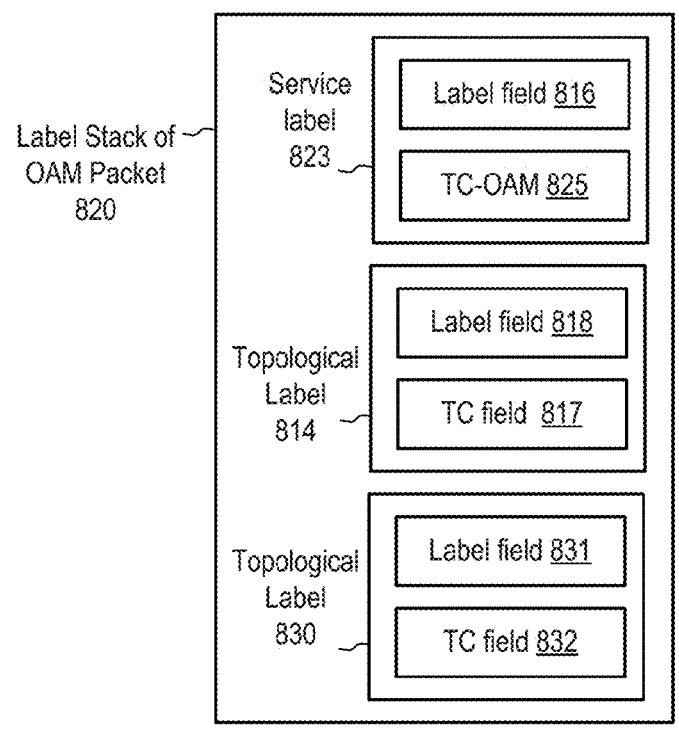
FIG. 8

```
Actions when label lookup results in a service-label:
    pop label
    if (LabelStackEntry.TC != HHHb) then
        apply service
    /* Continue original label stack processing */
```

FIG. 9

```
Pseudocode for Hash computation function:
do {
    if ( LabelStackEntry[i].label == EEL ) {
        i += 2; continue;
    }
    if ( LabelStackEntry[i].label == XL
         && LabelStackEntry[i+1].label == EEL )
        i += 2; continue;
    }
    /* ... */
    Hash = HashFunc(Hash,
            LabelStackEntry[i].label)
    i++;
} while ( !LabelStackEntry[i].BoS )
```

FIG. 14

LABEL STACK ENCODING AND PROCESSING TO ENABLE OAM PROCEDURES FOR SERVICE SEGMENTS IN SEGMENT ROUTED (SR) NETWORKS

CROSS-REFERENCE TO RELATED APPLICATIONS

This application claims the benefit of U.S. Provisional Application No. 61/954,334, filed Mar. 17, 2014, which is hereby incorporated by reference.

FIELD

Embodiments of the invention relate to the field of packet networks; and more specifically, to the creation of label stacks in segment routing (SR) networks.

BACKGROUND

Segment Routing (SR) (which can be instantiated for Internet Protocol version 6 (IPv6) or Multiprotocol Label Switching (MPLS)) is a technology based on source routing that enables steering of packets through segments of a SR network and applying services along the path. In SR, a label stack (also commonly referred to as a SR header) is prepended to a packet. A label stack includes labels, which can be topological or service instructions. When the packet reaches a Label Switching Router (LSR), one topological label is popped from the top of the label stack and processed. If there is any service label on top of the topological label, the LSR also pops all those service labels and applies the identified services. The packet and its label stack is then forwarded to the next LSR. The ability to apply services along the transport path and encode all that information in the label stack is one of the unique characteristics of the SR technology.

Operations Administration and Maintenance (OAM) functions are mandatory components in a network architecture. Some of the requirements for OAM in SR are described in I-D.kumar-spring-sr-oam-requirement, which is hereby incorporated by reference. OAM packets must follow the same path as the data packets in the Label Switched Path (LSP). In MPLS, the hash of the label stack is used to determine the next hop (i.e., link) in the case of Equal Cost Multi Path (ECMP) or Link Aggregation (LAG). Thus, in such cases, the service label directly influences the path taken by the packet. For this reason, OAM packets must have the service labels in the label stack in order to follow the same path as the data packets.

When a label stack includes a service label, the packet on the LSP can be processed and modified when the service is applied. However, OAM packets must not be processed by the services as if they are data packets. A conventional network architecture does not provide a mechanism for creating label stacks such that the OAM packet propagates through a SR network using the same path as the data packet, without causing a transit LSR to apply a service on the OAM packet.

SUMMARY

Exemplary methods performed by a first network device that is communicatively coupled to a second network device in a segment routing (SR) network include creating a first SR label stack for a data packet, wherein the first SR label stack causes the data packet to be forwarded through the SR network using a first set of links, and wherein the first SR label stack includes a first service label that identifies a first service to be applied to the data packet by the second network device. The methods include sending the data packet with the first SR label stack through the SR network.

In one embodiment, the method includes creating a second SR label stack for an operations administration and maintenance (OAM) packet, wherein the second SR label stack causes the OAM packet to be forwarded through the SR network using the first set of links, and wherein the second SR label stack prevents the second network device from applying the first service to the OAM packet. The method further includes sending the OAM packet with the second SR label stack through the SR network.

In one embodiment, creating the second SR label stack comprises copying the first SR label stack of the data packet to the second SR label stack of the OAM packet and inserting a first pop indicator label on top of the first service label in the second SR label stack, wherein the first pop indicator label causes the second network device to pop first service label from the second SR label stack without applying the first service to the OAM packet. In one such embodiment, inserting the first pop indicator label comprises inserting an extended special purpose label (ESPL)-generic pop indicator (GPI) on top of the first service label in the second SR label stack, wherein the ESPL-GPI causes the second network device to pop first service label from the second SR label stack without applying the first service to the OAM packet. In such an embodiment, the method further includes inserting an extension label (XL) on top of the ESPL-GPI, wherein the XL indicates that an ESPL is immediately below the XL in the second SR label stack.

In an alternative embodiment, inserting the first pop indicator label comprises inserting a generic pop indicator (GPI) reserved label on top of the first service label in the second SR label stack, wherein the GPI reserved label causes the second network device to pop first service label from the second SR label stack without applying the first service to the OAM packet.

In one embodiment, creating the second SR label stack comprises copying the first SR label stack of the data packet to the second SR label stack of the OAM packet, and setting a traffic class field of the first service label in the second SR label stack with a predetermined value to indicate that first service label belongs to a SR label stack of an OAM packet, wherein the traffic class field with the predetermined value causes the second network device to pop the first service label from the second SR label stack without applying the first service to the OAM packet.

According to one embodiment, creating the first SR label stack comprises inserting a first entropy exclusion indicator (EEI) label on top of the first service label in the first SR label stack, wherein the first entropy exclusion indicator label causes the second network device to determine a link for the data packet without using the first service label in the first SR label stack.

In one embodiment, creating the second SR label stack comprises copying the first SR label stack of the data packet to the second SR label stack of the OAM packet, without copying the first service label from the first SR label stack to the second SR label stack in order to prevent the second network device from applying the first service on the OAM packet.

In one embodiment, inserting the first EEI label comprises inserting an extended special purpose label (ESPL)-entropy exclusion indicator (EEI) on top of the first service label in the first SR label stack, wherein the ESPL-EEI causes the second network device to determine a link for the data packet without using the first service label in the first SR label stack, and inserting an extension label (XL) on top of the ESPL-EEI, wherein the XL indicates that an ESPL is immediately below the XL in the first SR label stack.

In an alternative embodiment, inserting the first EEI label comprises inserting an EEI reserved label on top of the first service label in the first SR label stack, wherein the EEI reserved label causes the second network device to determine a link for the data packet without using the first service label in the first SR label stack.

BRIEF DESCRIPTION OF THE DRAWINGS

The invention may best be understood by referring to the following description and accompanying drawings that are used to illustrate embodiments of the invention. In the drawings:

FIG. 4 is a diagram illustrating a pseudo code for creating and processing label stacks according to one embodiment.

FIG. 8 is a block diagram illustrating label stacks according to one embodiment.

FIG. 9 is a diagram illustrating a pseudo code for processing label stacks according to one embodiment.

FIG. 14 is a diagram illustrating a pseudo code for computing a hash of a label stack according to one embodiment.

DESCRIPTION OF EMBODIMENTS

Figure 1:
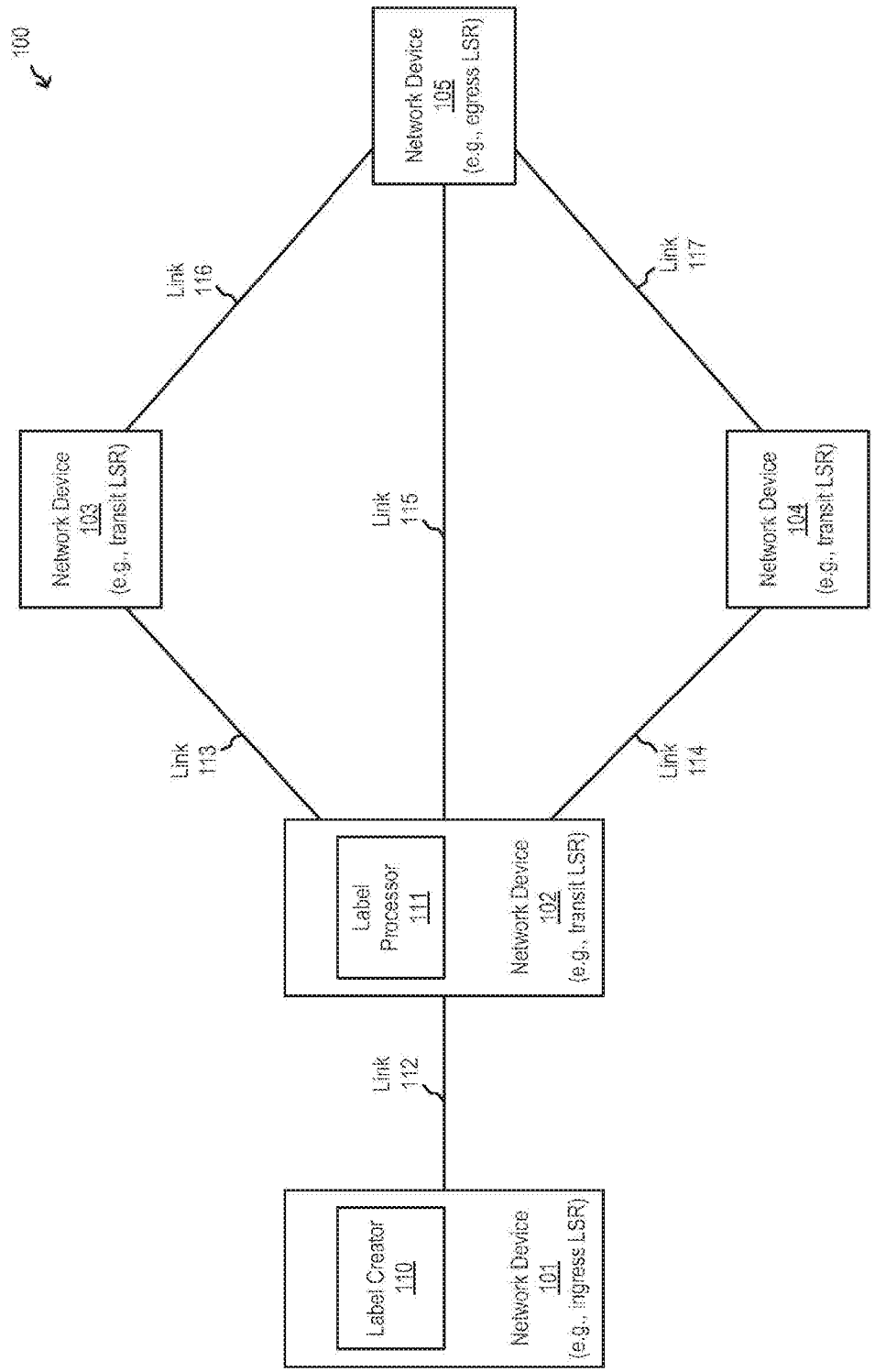
FIG. 1 is a block diagram illustrating a network according to one embodiment.

The following description describes methods and apparatuses for creating label stacks in a SR network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

Techniques for creating label stacks are herein described. According to one aspect of the invention, a first network device (e.g., an ingress LSR) creates a first data packet and its label stack, wherein the label stack includes one or more topological labels and one or more service labels. The first network device sends the first data packet and its label stack through a SR network towards an egress LSR, wherein the path taken by the first data packet is determined by the labels of the label stack. As used herein, a "path" refers to a set of one or more network links (i.e., hops).

In response to receiving the first data packet and its label stack, a second network device (e.g., a transit LSR) pops each service label from the top of the label stack until a topological label is detected. LSRs which pop and apply the service labels are herein referred to as service nodes/LSRs. Thus, a service LSR is a LSR which receives a label stack that includes one or more service labels at the top of the label stack. For each service label popped, the second network device applies the service identified by the service label on the first data packet. The second network device determines the next hop (i.e., link) to send the first data packet based on the labels of the label stack, for example, by computing a hash of the label stack. The second network device then sends the first data packet towards the egress LSR on the determined link.

The first network device determines to send a first OAM packet that must follow the same path as the first data packet. The first network device creates the first OAM packet and its label stack. In one embodiment, the first network device creates the label stack of the first OAM packet by copying the labels of the label stack of the first data packet to the label stack of the first OAM packet. The labels of the label stack of the first data packet can be replicated on the label stack of the first OAM packet using any mechanism. Conventionally, a service label in a label stack of an OAM packet causes the service LSR to apply the service identified by the service label on the OAM packet, which is undesirable. In one embodiment, the first network device overcomes such limitations by inserting a generic pop indicator (GPI) label on top of each service label that is in the label stack of the first OAM packet. In one embodiment, a GPI label causes the service LSR to pop the service label immediately below the GPI label without applying the service on the first OAM packet. The first network device then sends the first OAM packet and its label stack towards the egress LSR. Throughout the description, references are made to the "top" and "bottom" of the label stack. As used herein, labels at the top of the label stack are popped and processed before labels at the bottom of the label stack.

In response to receiving the label stack of the first OAM packet, the second network device pops each GPI label from the top of the label stack until a topological label is detected. According to one embodiment, for each GPI label popped, the second network device pops the service label immediately below the GPI label without applying the service on the first OAM packet. The second network device then determines the next hop of the first OAM packet without using the GPI label. For example, the second network device excludes the GPI label when computing the hash of the label stack to determine the next hop. The second network device then sends the first OAM packet out on the determined link. In this way, the first OAM packet will be forwarded through the SR network using the same path as the first data packet without causing any service to be applied to the first OAM packet.

According to another aspect of the invention, the first network device creates a second data packet and a corresponding label stack, wherein the label stack includes one or more topological labels and one or more service labels. The first network device sends the second data packet and its label stack through the SR network towards an egress LSR, wherein the path taken by the second data packet is determined by the labels of the label stack. Each service label and topological label includes a label field and a traffic class (TC) field. In one embodiment, the label field and the TC field are implemented as defined by Request for Comments (RFC 5462), which is hereby incorporated by reference.

In response to receiving the second data packet and its label stack, the second LSR pops each service label from the top of the label stack until a topological label is detected. For each service label popped, the second network device determines whether the TC field is encoded with a predetermined value indicating the service label belongs to a label stack of an OAM packet (described in further details below). In response to determining the service label does not belong to a label stack of an OAM packet, the second network device applies the service identified by the service label on the second data packet. The second network device determines the next hop (i.e., link) to send the second data packet based on the values encoded in the label fields of the label stack, for example, by computing a hash of the label field values. Note that the TC fields are not used in determining the next hop. The second network device then sends the second data packet out on the determined link.

The first network device determines to send a second OAM packet that must follow the same path as the second data packet. The first network device creates the second OAM packet and its label stack. In one embodiment, the first network device creates the label stack of the second OAM packet by copying the labels of the label stack of the second data packet to the label stack of the second OAM packet. The labels of the label stack of the second data packet can be replicated on the label stack of the second OAM packet using any mechanism.

Conventionally, a service label in an OAM packet label stack causes the service LSR to apply the service identified by the service label on the OAM packet, which is undesirable. In one embodiment, the first network device overcomes such limitations by encoding the TC field of each service label in the label stack of the second OAM packet with a predetermined value. In one embodiment, the predetermined TC value indicates that the service label belongs to a label stack of an OAM packet. A TC field which is encoded with the predetermined value shall herein be referred to as a TC-OAM. In one embodiment, a service label which includes a TC-OAM causes the service LSR to pop the service label without applying the service on the second OAM packet. The first network device then sends the second OAM packet and its label stack towards the egress LSR. Note that the TC field identifies a traffic class of a data packet. The TC field, however, is irrelevant in the case of an OAM packet. Thus, in this embodiment, the TC field has been redefined for OAM packets without affecting the data packets.

In response to receiving the label stack of the second OAM packet, the second network device pops each service label from the top of the label stack until a topological label is detected. According to one embodiment, for each service label popped, the second network device examines the TC field to determine if it is a TC-OAM indicating the service label belongs to a label stack of an OAM packet. In response to determining the service label belongs to the label stack of an OAM packet, the second network device pops the service label without applying the service on the second OAM packet. The second network device determines the next hop (i.e., link) to send the second OAM packet based on the values encoded in the label fields of the label stack, for example, by computing a hash of the label field values. Note that the values encoded in the TC fields are not utilized in the determination of the next hop. The second network device then sends the OAM packet out on the determined link. In this way, the second OAM packet will be forwarded through the SR network using the same path as the second data packet without causing any service to be applied to the second OAM packet.

According to yet another aspect of the invention, the first network device creates a third data packet and its label stack, wherein the label stack includes one or more topological labels and one or more service labels. Conventionally, a transit LSR determines the next hop of a packet by computing a hash of the labels in the label stack, including the service labels. Thus, in order for an OAM packet to follow the same path as a data packet, the label stack of the OAM packet must include the same labels as the data packet, including the service labels. The presence of service labels in the label stack of an OAM packet, however, causes services to be applied on the OAM packet, which is undesirable.

According to one embodiment, the first network device overcomes these limitations by inserting an entropy exclusion indicator (EEI) label on top of each service label in the label stack of the data packet. In such an embodiment, the EEI label causes the service LSR to exclude the EEI label and the service label immediately below it when computing the next hop. In this way, service labels no longer influence the path of the packet, and thus, service labels can be excluded from the label stack of the OAM packet. Once the third data packet and its label stack are created, the first network device sends the third data packet and its label stack through the SR network towards an egress LSR.

In response receiving the third data packet and its label stack, the second network device pops each EEI label and service label from the top of the label stack until a topological label is detected. For each EEI label popped, the second network device pops the service label immediately below it and applies the service identified by the service label. In one embodiment, in response to detecting the EEI label, the second network device excludes the EEI label and the service label immediately below it when determining the next hop. For example, the second network device excludes the EEI label and the service label when computing the hash of the label stack to determine the next hop. The second network device then sends the third data packet out on the determined next hop.

The first network device determines to send a third OAM packet that must follow the same path as the third data packet. The first network device creates the third OAM packet and its label stack. In one embodiment, the first network device creates the label stack of the third OAM packet by copying the labels of the label stack of the third data packet to the label stack of the third OAM packet. The first network device, however, does not copy the service labels because they do not influence the path of the OAM packet. In this way, the third OAM packet will be forwarded through the SR network using the same path as the third data packet without causing any service to be applied to the third OAM packet. The first network device then sends the third OAM packet and its label stack towards the egress LSR.

In response to receiving the label stack of the third OAM packet, the second network device pops and processes the top label from the label stack. Note that no services are applied to the OAM packet because its label stack does not include any service label. The second network device determines the next hop (i.e., link) to send the third OAM packet based on the topological labels in the label stack. The second network device then sends the OAM packet out on the determined link. Various aspects of the present invention shall now be described through the discussion of the figures below.

FIG. 1 is a block diagram illustrating SR network 100 according to one embodiment. Network 100 includes network device 101 (e.g., an ingress LSR) communicatively coupled to network device 102 (e.g., a transit LSR) via link 112. Network device 102 is communicatively coupled to network devices 103-104 (e.g., transit LSRs) via links 113-114, respectively. Network devices 102-104 are communicatively coupled to network device 105 (e.g., an egress LSR) via links 115-117, respectively. The network configuration in FIG. 1 is shown for illustrative purposes, and not intended to be limitations of the present invention.

SR leverages the source routing paradigm. In SR, a node (e.g., a SR capable network device) steers a packet through the network by utilizing a set of instructions, herein referred to as labels. The labels are included as part of a label stack (also commonly referred to as the SR header) which has been prepended onto the packet at the ingress. A label can represent any topological or service instruction. As used herein, a service label identifies a service that is to be applied on the packet by the service LSR.

As used herein, a topological label defines one or more paths that the packet may take as it propagates from an ingress to the egress LSR. In cases where a topological label defines multiple paths, a next hop is determined by, for example in ECMP or LAG, performing a hash on the label stack. Such a multi-path resolution mechanism ensures that the packets of a particular packet flow are always forwarded on the same next hop to preserve packet flow ordering. By way of example, a data packet injected into network 100 at network device 101 may reach network device 105 via a first path comprising of links 112, 113, and 116, or a second path comprising of links 112 and 115, or a third path comprising of links 112, 114, and 117. In ECMP or LAG, the routing system may resolve the multiple paths into one path based on the hash of the label stack.

Operation, Administration, and Maintenance (OAM) describes processes, activities, tools, standards, etc., involved with operating, administering, and maintaining computer networks. OAM is implemented for many different types of computer networks, such Ethernet, Internet Protocol (IP), multi-protocol label switching (MPLS), SR-MPLS, asynchronous transfer mode (ATM), virtual private LAN service (VPLS), etc. Each type of network will have a different type of OAM. For example, in an Ethernet network, 802.1ag Connectivity Fault Management (CFM) is used as an OAM management tool, and in a MPLS/VPLS network Virtual Circuit Connectivity Verification (VCCV) is used as an OAM tool. OAM tools are used, in part, to detect network connectivity faults, measure network performance, etc.

In order for OAM to function properly, an OAM packet must follow the same path as the data packet. Throughout the description, references are made to an OAM packet following the same path as the data packet. Here, it shall be understood that such references refer to the OAM packet following the same path as a data packet that belongs to the same packet flow as the OAM packet. For example, a network administrator may want to determine the performance of the network with respect to a packet flow in which data packets flow from network device 101 to network device 105 via links 112 and 115. In order to accurately measure the performance, the administrator must be able to inject an OAM packet that follows the same path as the data packet (i.e., via links 112 and 115). Some packet flows may include services (e.g., firewall, network address translation, etc.) being performed on the data packets. In such instances, an ingress LSR that injects the packet includes service labels in the label stack. These service labels identify the services to be performed.

Conventionally, in cases where a data packet may flow through a network using multiple paths, each transit LSR determines the next hop of a data packet by performing a hash on the labels of the label stack. Thus, in order to ensure that an OAM packet follows the same path as a data packet, the label stack of an OAM packet must include all the labels of the label stack of the data packet. If the label stack of the data packet includes a service label, the label stack of the OAM packet must also include the same service label. This results in services being applied to the OAM packet, which is undesirable. Embodiments of the present invention overcome these limitations by including a label creator such as label creator 110 at an ingress LSR such as network device 101, and a label processor such as label processor 111 at a transit and/or egress LSR, such as network device 102. Label creator 110 and label processor 111 are illustrated as modules of network devices 101 and 102, respectively. It shall be understood, however, that similar label creators and/or label processors can be implemented at any network device. For example, label processor 111 may be implemented at each of the transit and egress LSR in the network. These label creators and processors are not shown, however, in order to avoid obscuring the invention. Label creators and label processors can be implemented as software, firmware, hardware, or any combination thereof. Label creator 110 and label processor 111 are described in further details below.

Figure 2:
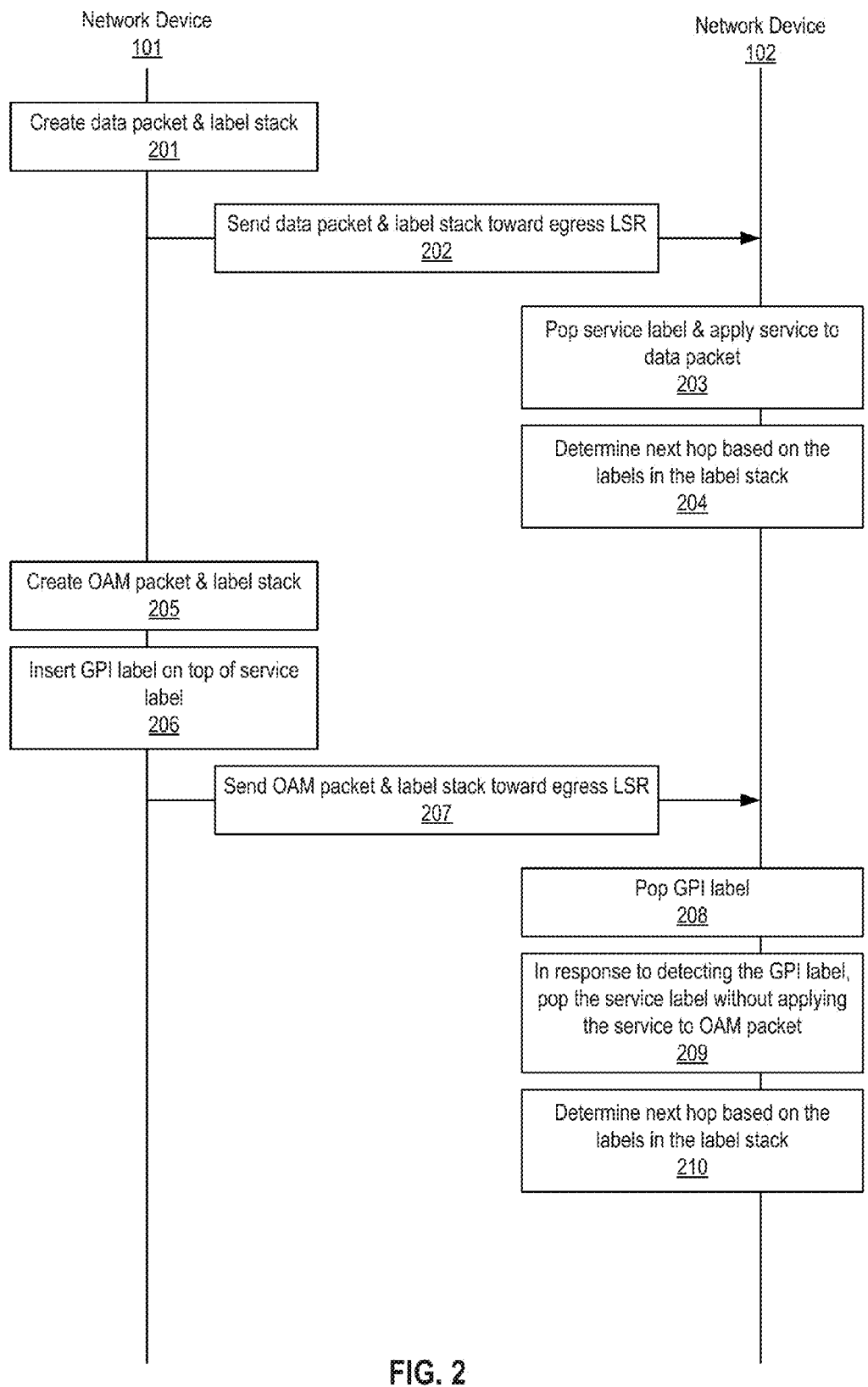
FIG. 2 is a transaction diagram illustrating transactions for creating and processing label stacks according to one embodiment.

FIG. 2 is a transaction diagram illustrating a mechanism for creating and processing label stacks according to one embodiment. The transactions of FIG. 2 are described with respect to network devices 101-102 of network 100. It shall be understood, however, that the transactions can be performed by any network device of network 100.

Figure 3:
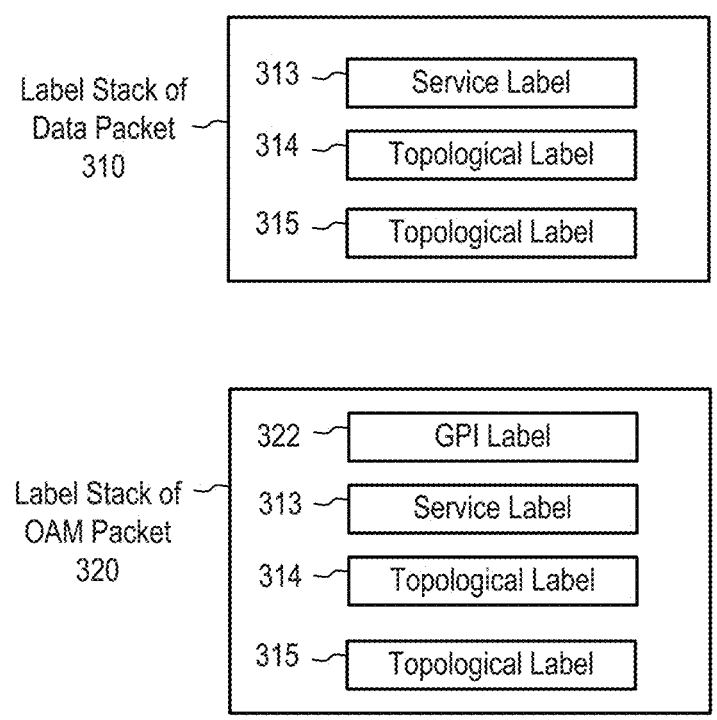
FIG. 3 is a block diagram illustrating label stacks according to one embodiment.

Referring now to FIG. 2. At transaction 201, network device 101 (e.g., label creator 110 of network device 101) creates a data packet and its label stack, such as label stack 310 illustrated in FIG. 3. As shown in FIG. 3, label stack 310 includes service label 313 and topological labels 314-315. One having ordinary skill in the art would recognize that more or less service labels and/or topological labels can be included as part of label stack 310.

Referring now back to FIG. 2. At transaction 202, network device 101 sends the created data packet and label stack to network device 102. At transaction 203, in response to receiving the data packet and label stack, network device 102 (e.g., label processor 111 of network device 102) pops each service label at the top of the label stack until a topological label is detected. For example, network device 102 pops service label 313 and topological label 314 from label stack 310. Network device 102 applies the service(s) identified by each of the popped service labels.

At transaction 204, network device 102 determines the next hop of the data packet based on the label stack. For example, network 102 performs a hash of service label 313 and topological labels 314-315 to determine the next hop of the data packet. Throughout the description, the hash function is used as an exemplary function for determining the next hop. It shall be understood that other functions can be used without departing from the broader scope and spirit of the present invention. By way of example, based on the labels of label stack 310, network device 102 may determine that the next hop for the data packet is link 115, and sends the data packet towards the egress LSR via link 115.

At transaction 205, network device 101 creates an OAM packet and its label stack, such as label stack 320 shown in FIG. 3. According to one embodiment, network device 102 creates the OAM packet label stack by replicating the labels of the label stack of a data packet of the same packet flow. Thus, as shown in FIG. 3, service label 313 and topological labels 314-315 are replicated from label stack 310 to label stack 320.

Conventionally, a service label in an OAM packet label stack causes the service LSR to apply the identified service on the OAM packet, which is undesirable. In one embodiment, network device 101 overcomes such limitations by inserting a generic pop indicator (GPI) label on top of each service label that is in the OAM packet label stack. For example, network device 101 inserts GPI label 322 on top of service label 313 in label stack 320. In one embodiment, GPI label 322 causes the service LSR to pop the service label immediately below it (e.g., service label 313) without applying the identified service on the OAM packet.

According to one embodiment, GPI label 322 is implemented as a GPI Reserved Label. As used herein, a "GPI Reserved Label" is a reserved label defined by Request for Comments (RFC) 3032, which is hereby incorporated by reference. In an alternate embodiment, GPI label 322 is implemented as an Extended Special Purpose Label-Generic Pop Indicator (ESPL-GPI). As used herein, an "ESPL-GPI" is a special purpose label as defined by I-D.ietf-mpls-special-purpose-labels, which is hereby incorporated by reference. As described in I-D.ietf-mpls-special-purpose-labels, each ESPL label must be preceded by an Extended Label (XL).

Referring now to FIG. 2. At transaction 207, network device 101 sends the created OAM packet and label stack to network device 102. At transaction 208, network device 102 pops each GPI label at the top of the received label stack until a topological label is detected. At transaction 209, in response to detecting a GPI label (e.g., GPI label 322), network device 102 pops a service label immediately below it (e.g., service label 313) without applying the service to the OAM packet. At transaction 210, network device 102 determines the next hop of the received OAM packet based on the label stack. For example, network device 102 performs a hash of service label 313 and topological labels 314-315 to determine the next hop of the OAM packet. According to one embodiment, GPI labels such as GPI label 322 are not used by transit LSRs when determining the next hop. Thus, for the purposes of next hop determination, the label stack of the OAM packet (e.g., label stack 320) includes the same labels as the label stack of the data packet (e.g., label stack 310). As such, the OAM packet is forwarded through the network using the same path as the data packet. Unlike a conventional OAM packet label stack, however, the OAM packet label stack of the present invention includes a GPI label to prevent any service from being applied to the OAM packet.

FIG. 4 is a diagram illustrating pseudo code 400 for creating OAM packet label stacks according to one embodiment. For example, portion 401 of pseudo code 400 can be performed by an ingress LSR, such as, for example, network device 101. Portion 402 of pseudo code 400 can be performed by a transit and/or an egress LSR, such as, for example, network devices 102-105.

Figure 5:
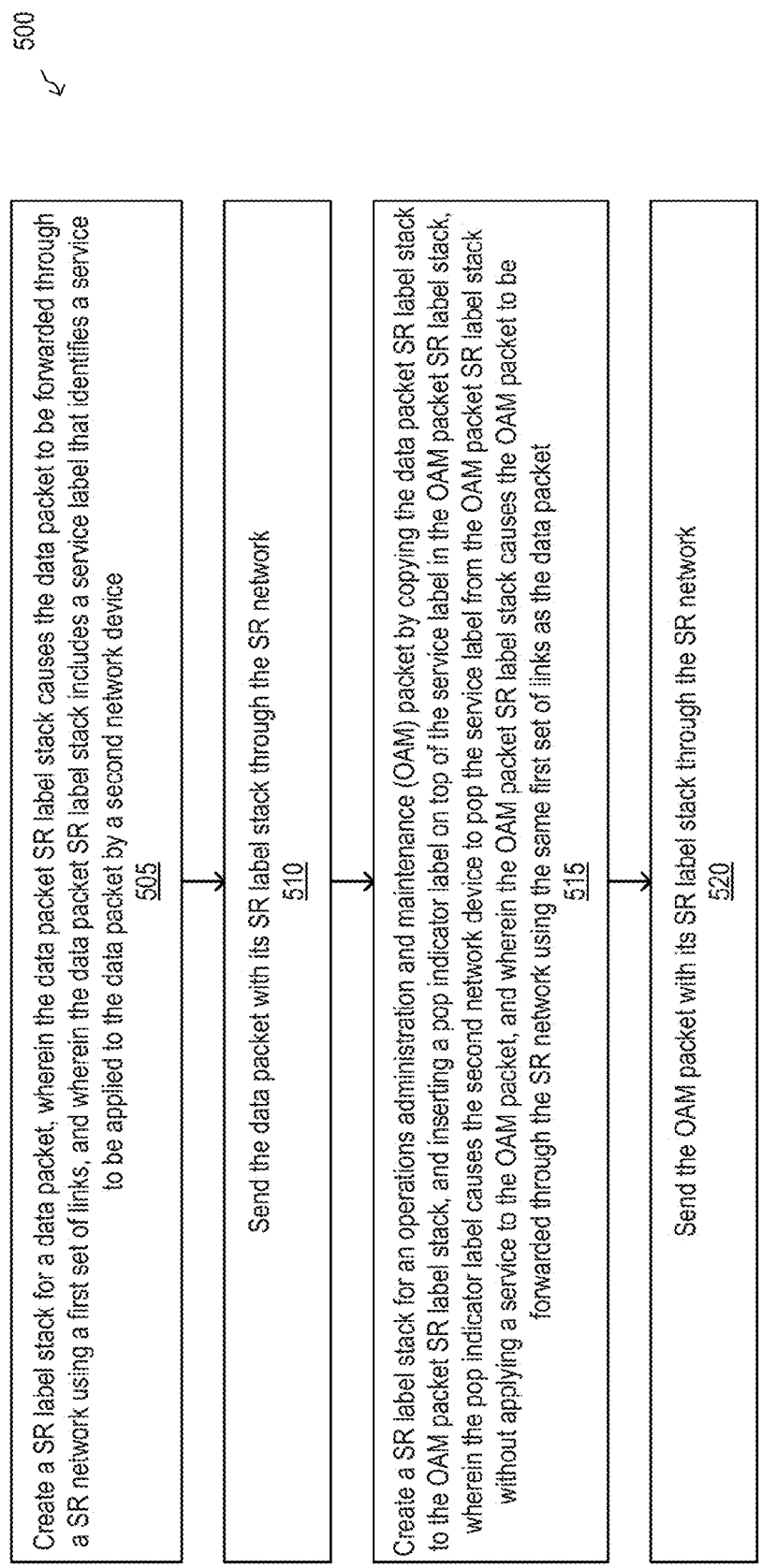
FIG. 5 is a flow diagram illustrating a method for creating label stacks according to one embodiment.

FIG. 5 is a flow diagram illustrating method 500 for creating label stacks according to one embodiment. For example, method 500 can be performed by network device 101 (e.g., label creator 110 of network device 110), which in one embodiment, is an ingress LSR. Method 500 can be implemented in software, firmware, hardware, or any combination thereof. The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams.

Referring now to FIG. 5. At block 505, a first network device creates a SR label stack (e.g., label stack 310) for a data packet, wherein the data packet SR label stack causes the data packet to be forwarded through a SR network (e.g., network 100) using a first set of links (e.g., links 112 and 115), and wherein the data packet SR label stack includes a service label (e.g., service label 313) that identifies a service to be applied to the data packet by a second network device (e.g., network device 102). At block 510, the first network device sends the data packet with its SR label stack through the SR network towards an egress LSR.

At block 515, the first network device creates a SR label stack (e.g., label stack 320) for an operations administration and maintenance (OAM) packet by copying the data packet SR label stack to the OAM packet SR label stack, and inserting a generic pop indicator label (e.g., GPI label 322) on top of the service label (e.g., service label 313) in the OAM packet SR label stack, wherein the pop indicator label causes the second network device to pop the service label from the OAM packet SR label stack without applying the service to the OAM packet, and wherein the OAM packet SR label stack causes the OAM packet to be forwarded through the SR network using the same first set of links as the data packet. At block 520, the first network device sends the OAM packet and its SR label stack through the network towards an egress LSR.

Figure 6:
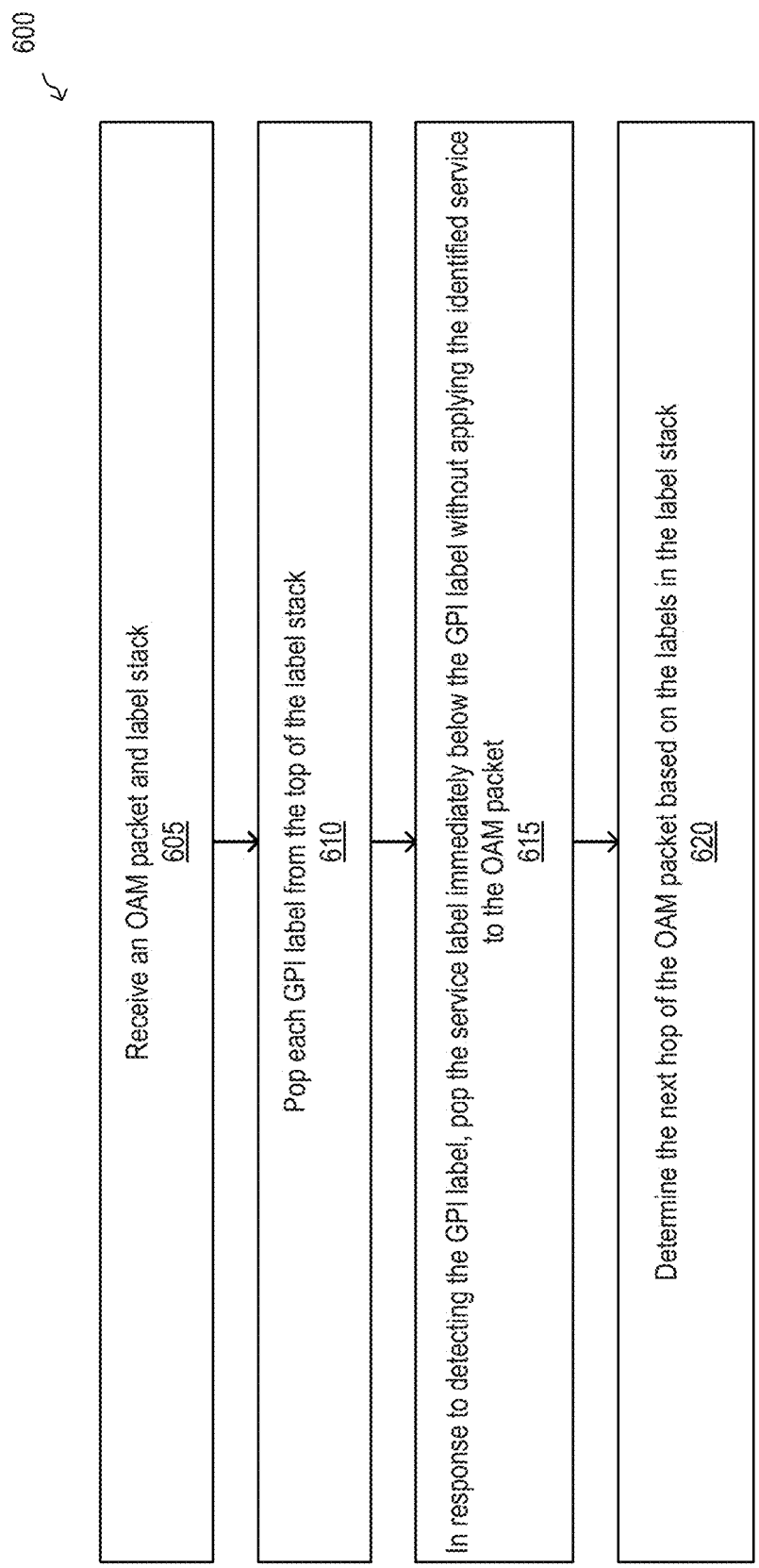
FIG. 6 is a flow diagram illustrating a method for processing label stacks according to one embodiment.

FIG. 6 is a flow diagram illustrating method 600 for processing label stacks according to one embodiment. For example, method 600 can be performed by network device 102 (e.g., label processor 111 of network device 102), which in one embodiment, is a transit or egress LSR. Method 600 can be implemented in software, firmware, hardware, or any combination thereof.

Referring now to FIG. 6. At block 605, a network device receives an OAM packet and its label stack (e.g., label stack 320). At block 610, the network device pops each GPI label (e.g., GPI label 322) from the top of the label stack until a topological label is detected. At block 615, in response to detecting the GPI label, the network device pops the service label (e.g., service label 313) immediately below the GPI label without applying the identified service to the OAM packet. At block 620, the network device determines the next hop of the OAM packet based on the labels in the label stack. Note that the network device does not use the GPI label when determining the next hop of the OAM packet.

Figure 7:
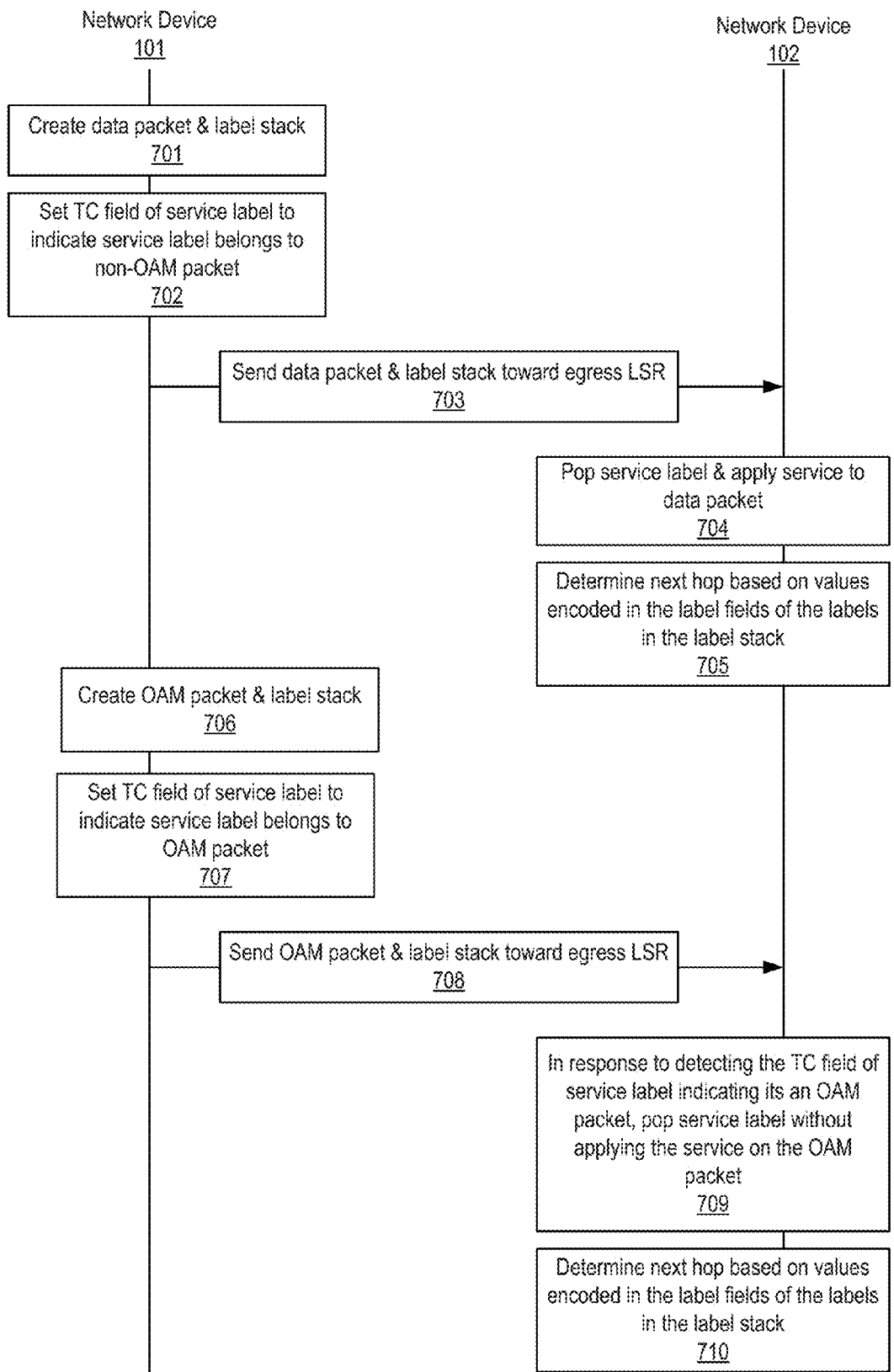
FIG. 7 is a transaction diagram illustrating transactions for creating and processing label stacks according to one embodiment.

FIG. 7 is a transaction diagram illustrating a mechanism for creating and processing label stacks according to one embodiment. The transactions of FIG. 7 are described with respect to network devices 101-102 of network 100. It shall be understood, however, that the transactions can be performed by any network device of network 100.

Referring now to FIG. 7. At transaction 701, network device 101 (e.g., label creator 110 of network device 101) creates a data packet and its label stack, such as label stack 810 illustrated in FIG. 8. As shown in FIG. 8, label stack 810 includes service label 813 and topological labels 814-815. One having ordinary skill in the art would recognize that more or less service labels and/or topological labels can be included as part of label stack 810. According to one embodiment, each label includes a label field and a TC field. In the illustrated embodiment, service label 813 includes label field 816 and TC field 815, topological label 814 includes label field 818 and TC field 817, and topological label 830 includes label field 831 and TC field 832.

Referring now back to FIG. 7. At transaction 702, network device 101 encodes the TC field of a service label in the label stack with a value to specify the traffic class of the data packet. Since this encoded TC value is a not the predefined TC-OAM value, it indicates that the service label does not belong to an OAM packet. At transaction 703, network device 101 sends the created data packet and label stack to network device 102. At transaction 704, in response to receiving the data packet and label stack, network device 102 (e.g., label processor 111 of network device 102) pops each service label at the top of the label stack until a topological label is detected. For example, network device pops service label 813 and topological label 814 from label stack 810. Network device 102 applies the service(s) identified by each of the popped service labels.

At transaction 705, network device 102 determines the next hop of the data packet based on the values encoded in the label fields (e.g., label fields 816, 818, and 831) of the label stack. For example, network 102 performs a hash of such encoded values to determine the next hop of the data packet. By way of example, based on the encoded values of the label fields of label stack 810, network device 102 may determine that the next hop for the data packet is link 115, and sends the data packet towards the egress LSR via link 115. Note here that the values encoded in the TC fields (e.g., TC fields 815, 817, and 832) are not used in determining the next hop of the data packet.

At transaction 706, network device 101 creates an OAM packet and its label stack, such as label stack 820 shown in FIG. 8. According to one embodiment, network device 102 creates the OAM packet label stack by replicating the labels of the label stack of a data packet of the same packet flow. Thus, as shown in FIG. 8, topological labels 814 and 830 are replicated from label stack 810 to label stack 820.

Conventionally, a service label in an OAM packet label stack causes the service LSR to apply the identified service on the OAM packet, which is undesirable. In one embodiment, network device 101 overcomes such limitations by replicating each service label from the data packet label stack to the OAM packet label stack, and modifying the TC field of each service label in the OAM packet label stack to indicate that the service label belongs to an OAM packet. For example, network device 101 replicates service label 813 to service label 823, and modifies TC field 825 of service label 823 to be a TC-OAM. The TC-OAM causes the service LSR to pop the service label without applying the identified service on the OAM packet.

Referring now to FIG. 7. At transaction 708, network device 101 sends the created OAM packet and its label stack to network device 102. At transaction 709, network device 102 pops each service label at the top of the received label stack until a topological label is detected. As part of transaction 709, in response to detecting a service label with a TC-OAM (e.g., service label 823), network device 102 pops the service label without applying the identified service to the OAM packet. At transaction 710, network device 102 determines the next hop of the received OAM packet based on the values encoded in the label fields of the labels in the received label stack. For example, network 102 performs a hash of the values encoded in label fields 816, 818, and 831 to determine the next hop of the OAM packet. Note that the values encoded in the TC fields (e.g., TC fields 825, 817, and 832) are not used by network device 102 to determine the next hop. The TC fields define the traffic class of the data packets. For OAM packets, the TC fields are irrelevant. Thus, unlike a conventional OAM packet label stack, the OAM packet label stack of the present invention includes a TC-OAM in each service label to prevent any service from being applied to the OAM packet.

FIG. 9 is a diagram illustrating pseudo code 900 for processing label stacks according to one embodiment. For example, pseudo code 900 can be performed by a transit or an egress LSR, such as, for example, network devices 102-105. In FIG. 9, the predefined TC value which indicates the TC field is a TC-OAM is shown as "HHHb".

Figure 10:
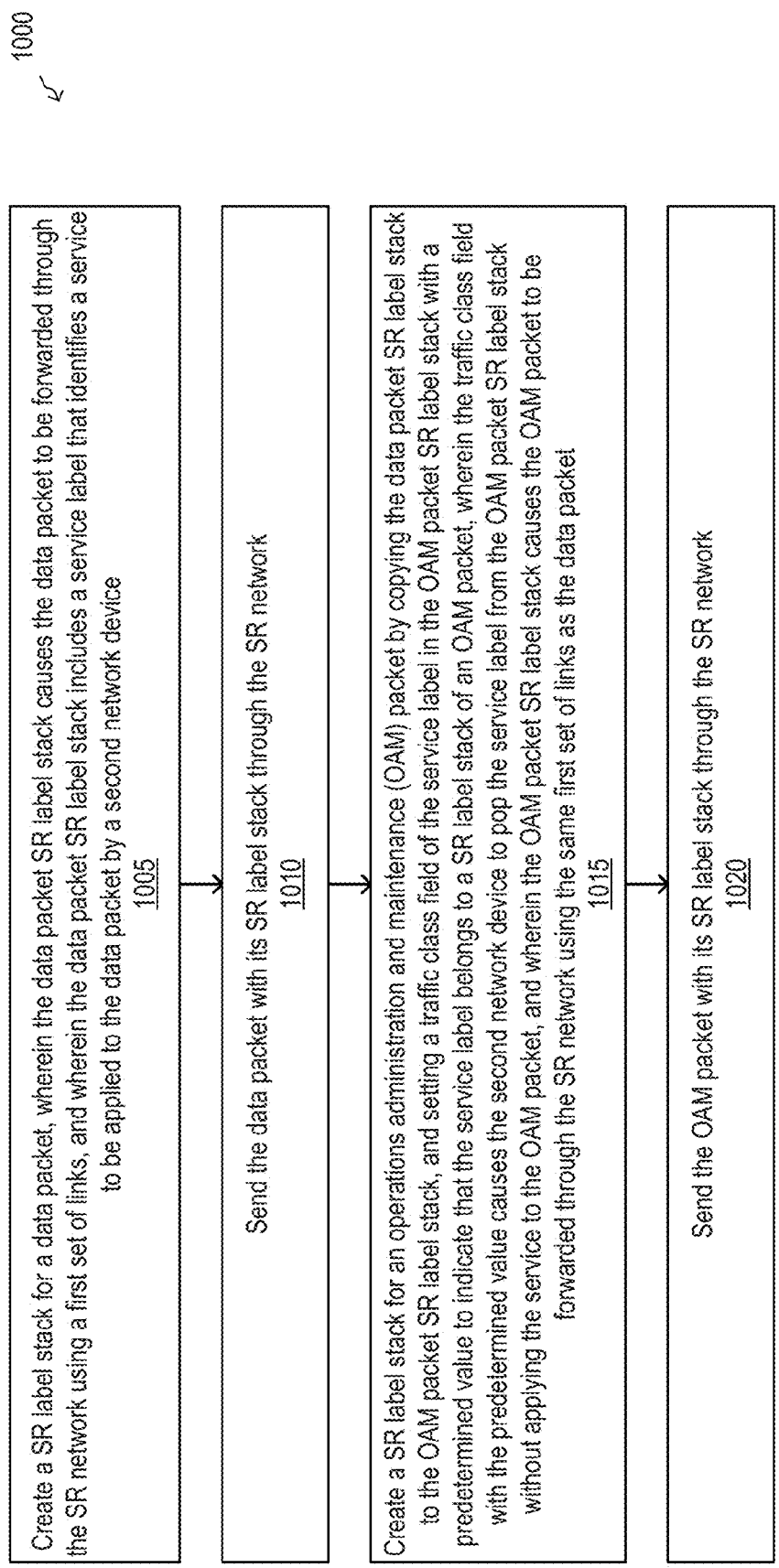
FIG. 10 is a flow diagram illustrating a method for creating label stacks according to one embodiment.

FIG. 10 is a flow diagram illustrating method 1000 for creating label stacks according to one embodiment. For example, method 1000 can be performed by network device 101 (e.g., label creator 110 of network device 101), which in one embodiment, is an ingress LSR. Method 1000 can be implemented in software, firmware, hardware, or any combination thereof.

Referring now to FIG. 10. At block 1005, a first network device creates a SR label stack (e.g., label stack 810) for a data packet, wherein the data packet SR label stack causes the data packet to be forwarded through the SR network using a first set of links, and wherein the data packet SR label stack includes a service label (e.g., service label 813) that identifies a service to be applied to the data packet by a second network device (e.g., network device 102). At block 1010, the first network device sends the data packet and its SR label stack through the SR network.

At block 1015, the first network device creates a SR label stack for an operations administration and maintenance (OAM) packet by copying the data packet SR label stack (e.g., label stack 810) to the OAM packet SR label stack (e.g., label stack 820), and setting a traffic class field (e.g., TC field 825) of a service label (e.g., service label 823) in the OAM packet SR label stack with a predetermined value to indicate that the service label belongs to a SR label stack of an OAM packet, wherein the traffic class field with the predetermined value causes the second network device to pop the service label from the OAM packet SR label stack without applying the service to the OAM packet, and wherein the OAM packet SR label stack causes the OAM packet to be forwarded through the SR network using the same first set of links as the data packet. At block 1020, the first network device sends the OAM packet and its SR label stack through the SR network.

Figure 11:
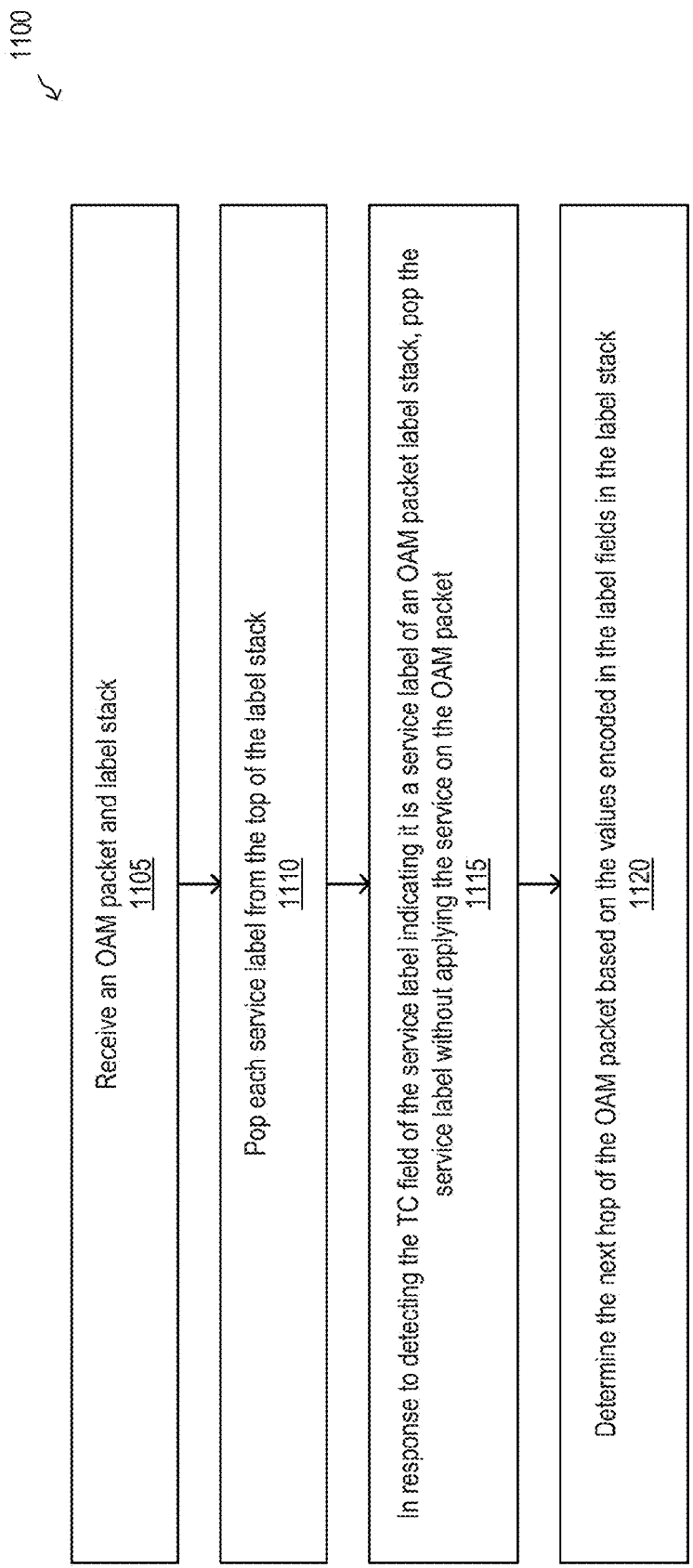
FIG. 11 is a flow diagram illustrating a method for processing label stacks according to one embodiment.

FIG. 11 is a flow diagram illustrating method 1100 for processing label stacks according to one embodiment. For example, method 1100 can be performed by network device 102 (e.g., label processor 111 of network device 102), which in one embodiment, is a transit or egress LSR. Method 1100 can be implemented in software, firmware, hardware, or any combination thereof.

Referring now to FIG. 11. At block 1105, a network device receives an OAM packet and its label stack (e.g., label stack 820). At block 1110, the network device pops each service label (e.g., service label 823) from the top of the label stack until a topological label is detected. At block 1115, in response to detecting the TC field of the service label indicating it is a service label of an OAM packet label stack, the network device pops the service label without applying the service on the OAM packet. For example, in response to detecting TC-OAM 825, the network device pops service label 823 without applying the identified service to the received OAM packet. At block 1120, the network device determines the next hop of the OAM packet based on the values encoded in the label fields (e.g., label fields 816, 818, and 831) of the labels in the label stack.

Figure 12:
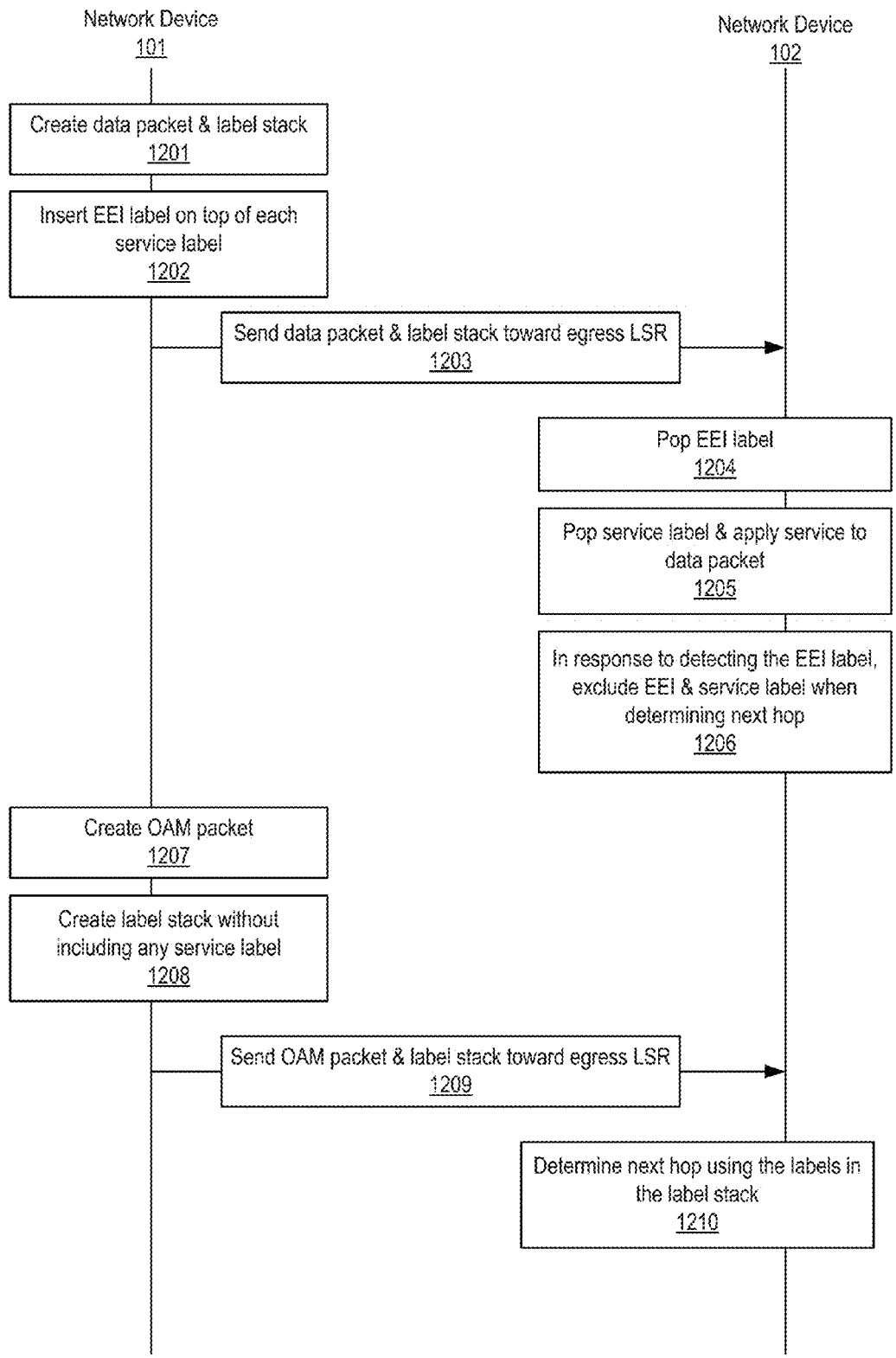
FIG. 12 is a transaction diagram illustrating transactions for creating and processing label stacks according to one embodiment.

FIG. 12 is a transaction diagram illustrating a mechanism for creating and processing label stacks according to one embodiment. The transactions of FIG. 12 are described with respect to network devices 101-102 of network 100. It shall be understood, however, that the transactions can be performed by any network device of network 100.

Figure 13:
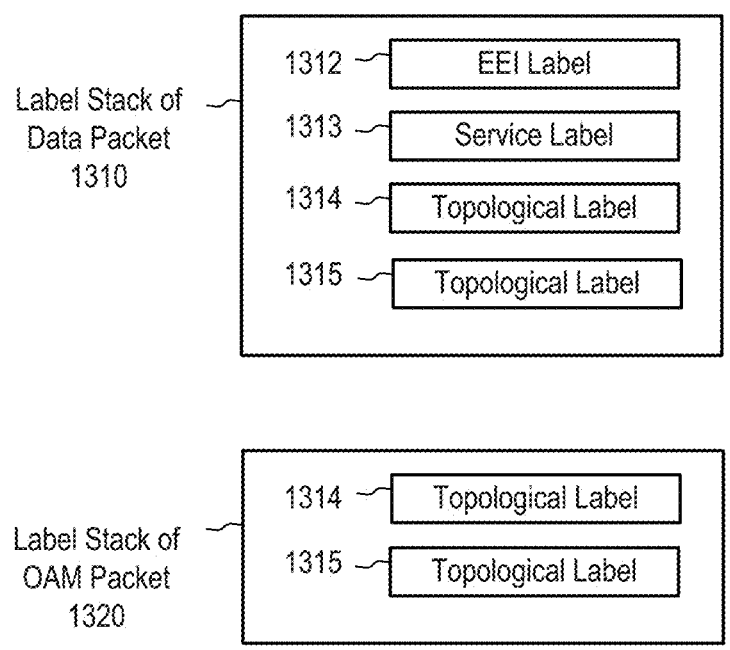
FIG. 13 is a block diagram illustrating label stacks according to one embodiment.

Referring now to FIG. 12. At transaction 1201, network device 101 (e.g., label creator 110 of network device 101) creates a data packet and its label stack, such as label stack 1310 illustrated in FIG. 13. As shown in FIG. 13, label stack 1310 includes service label 1313 and topological labels 1314-1315. One having ordinary skill in the art would recognize that more or less service labels and/or topological labels can be included as part of label stack 1310.

Conventionally, a transit LSR determines the next hop of a packet by computing a hash of the labels in the label stack, including the service labels. Thus, in order for an OAM packet to follow the same path as a data packet, the label stack of the OAM packet must include the same labels as the data packet, including the service labels. The presence of service labels in the label stack of an OAM packet, however, causes services to be applied on the OAM packet, which is undesirable.

Referring now back to FIG. 12. At transaction 1202, network device 101 overcomes the above described limitations by inserting an entropy exclusion indicator (EEI) label on top of each service label in the label stack of the data packet. For example, network device 101 inserts EEI label 1312 on top of service label 1313 of label stack 1310. In such an embodiment, the EEI label causes the service LSR to exclude the EEI label and the service label immediately below it when computing the next hop. In this way, service labels no longer influence the path of the packet, and thus, service labels can be excluded from the label stack of the OAM packet.

According to one embodiment, EEI label 1312 is implemented as an EEI Reserved Label. As used herein, a "EEI Reserved Label" is a reserved label defined by Request for Comments (RFC) 3032, which is hereby incorporated by reference. In an alternate embodiment, EEI label 1312 is implemented as an Extended Special Purpose Label-Entropy Exclusion Indicator (ESPL-EEI). As used herein, an "ESPL-EEI" is a special purpose label as defined by I-D.ietf-mpls-special-purpose-labels, which is hereby incorporated by reference. As described in I-D.ietf-mpls-special-purpose-labels, each ESPL label must be preceded by an Extended Label (XL).

At transaction 1203, network device 101 sends the created data packet and label stack to network device 102. At transaction 1204, network device 102 (e.g., label processor 111 of network device 102) pops each EEI label at the top of the received label stack until a topological label is detected. At transaction 1205, for each EEI label popped, network device 102 pops a service label immediately below it, and applies the identified service to the received data packet. At block 1206, in response to detecting the EEI label, network device 102 excludes the EEI label and the service label immediately below it when determining the next hop of the received data packet. For example, in response to detecting EEI label 1312, network device 102 excludes EEI label 1312 and service label 1313 when computing the hash of the label stack to determine the next hop of the data packet. By way of example, based on topological labels 1314 and 1315 of label stack 1310, network device 102 may determine that the next hop for the data packet is link 115, and sends the data packet towards the egress LSR via link 115.

At transaction 1207, network device 101 creates an OAM packet. At transaction 1208, network device 1208 creates the label stack of the OAM packet, such as label stack 1320 shown in FIG. 13. According to one embodiment, network device 102 creates the OAM packet label stack by replicating the topological labels of the data packet label stack of the same packet flow. Given that service labels do not influence the path of a packet, network device 101 does not, according to this embodiment, replicate the service labels from the data packet label stack to the OAM packet label stack. Thus, as shown in FIG. 13, EEI label 1312 and service label 1313 are not replicated from label stack 1310 to label stack 1320.

Referring now to FIG. 12. At transaction 1209, network device 101 sends the created OAM packet and label stack to network device 102. At transaction 1210, network device 102 determines the next hop of the OAM packet based on the topological labels of the received label stack, for example, by computing a hash on topological labels 1314-1315 of label stack 1320. Network device 102 then sends the OAM packet on the determined next hop.

FIG. 14 is a diagram illustrating pseudo code 1400 for computing a hash of a label stack to determine the next hop of a packet according to one embodiment. For example, pseudo code 1400 can be performed by an ingress LSR, such as, for example, network device 101.

Figure 15:
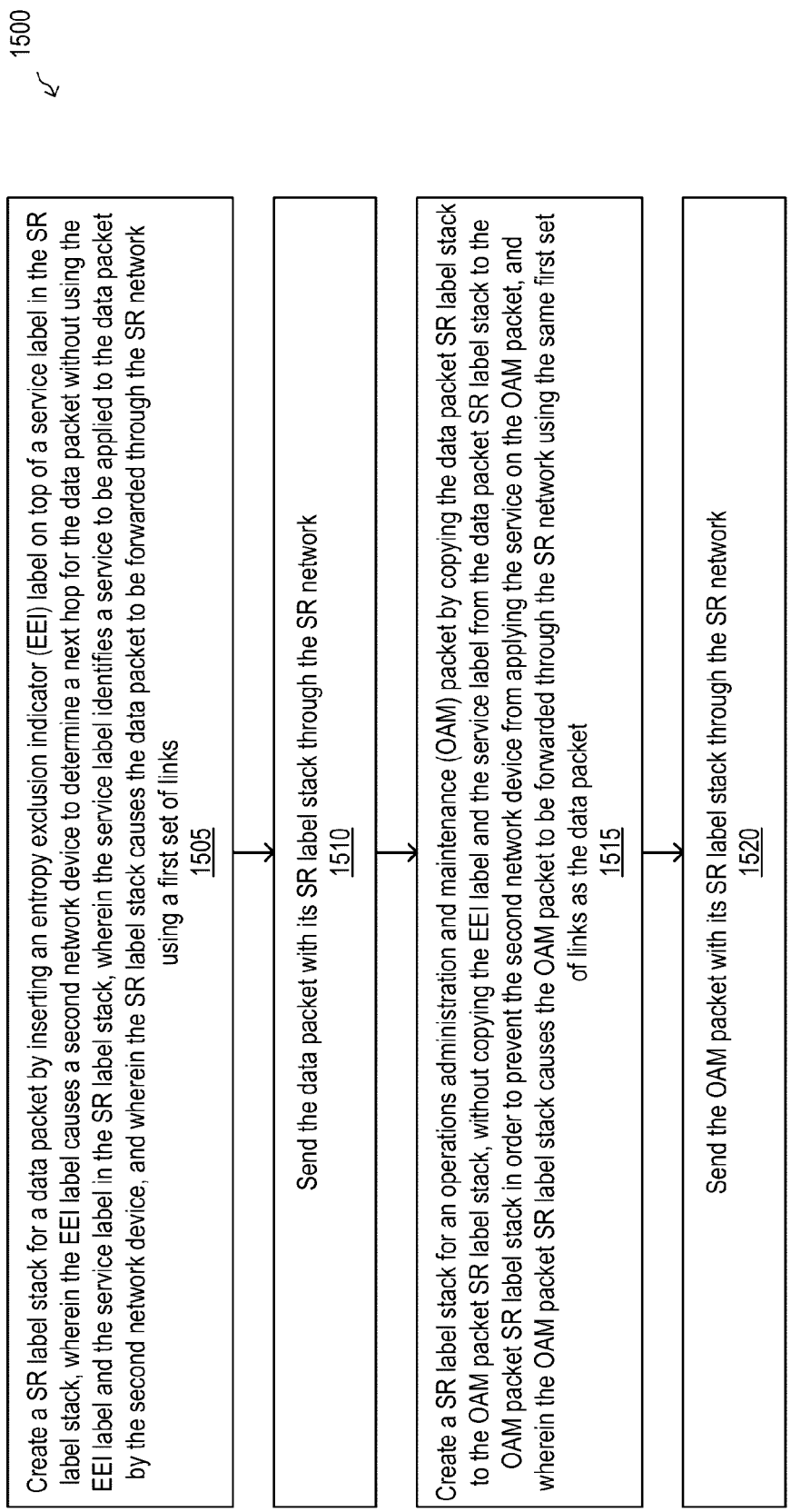
FIG. 15 is a flow diagram illustrating a method for creating label stacks according to one embodiment.

FIG. 15 is a flow diagram illustrating method 1500 for creating label stacks according to one embodiment. For example, method 1500 can be performed by network device 101 (e.g., label creator 110 of network device 101), which in one embodiment, is an ingress LSR. Method 1500 can be implemented in software, firmware, hardware, or any combination thereof.

Referring now to FIG. 15. At block 1505, a first network device creates a SR label stack (e.g., label stack 1310) for a data packet by inserting an entropy exclusion indicator (EEI) label (e.g., EEI label 1312) on top of a service label (e.g., service label 1313) in the SR label stack, wherein the EEI label causes a second network device (e.g., network device 102) to determine a next hop for the data packet without using the EEI label and the service label in the SR label stack, wherein the service label identifies a service to be applied to the data packet by the second network device, and wherein the SR label stack causes the data packet to be forwarded through the SR network using a first set of links. At block 1510, the first network device sends the created data packet and its SR label stack through the SR network.

At block 1515, the first network device creates a SR label stack (e.g., label stack 1320) for an operations administration and maintenance (OAM) packet by copying the data packet SR label stack (e.g., label stack 1310) to the OAM packet SR label stack, without copying the EEI label (e.g., EEI label 1312) and the service label (e.g., service label 1313) from the data packet SR label stack to the OAM packet SR label stack in order to prevent the second network device from applying the service on the OAM packet, and wherein the OAM packet SR label stack causes the OAM packet to be forwarded through the SR network using the same first set of links as the data packet. At block 1520, the first network device sends the created OAM packet and its SR label stack through the SR network.

Figure 16:
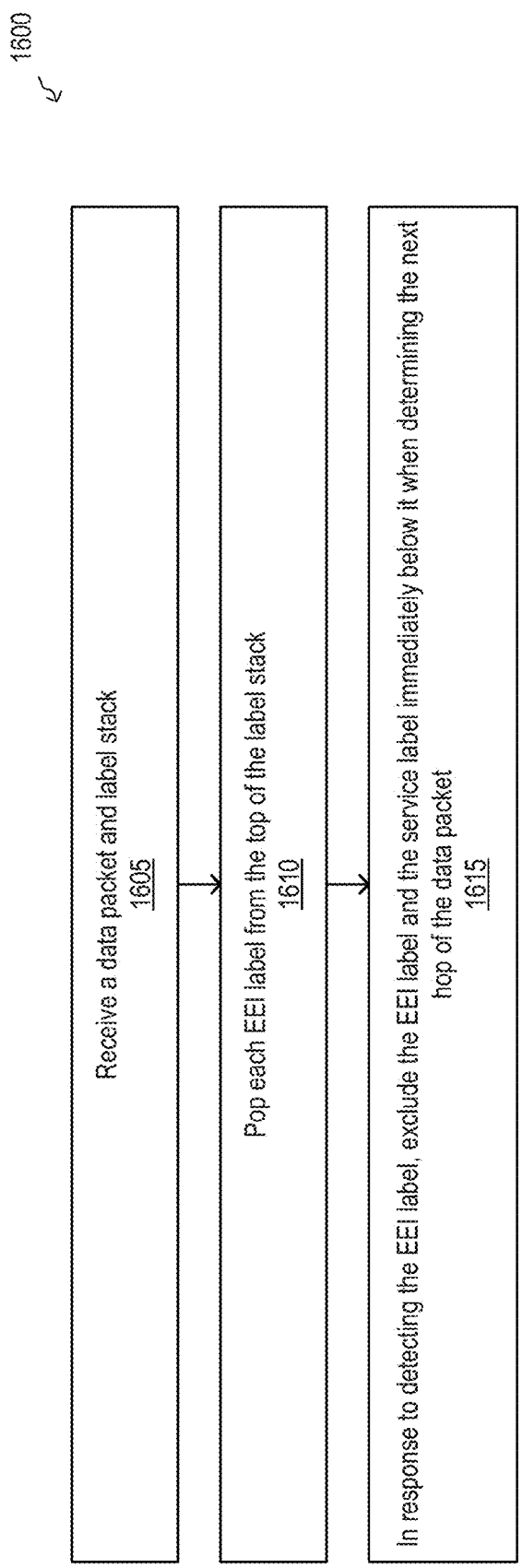
FIG. 16 is a flow diagram illustrating a method for processing label stacks according to one embodiment.

FIG. 16 is a flow diagram illustrating method 1600 for processing label stacks according to one embodiment. For example, method 1600 can be performed by network device 102 (e.g., label processor 111 of network device 102), which in one embodiment, is a transit or egress LSR. Method 1600 can be implemented in software, firmware, hardware, or any combination thereof.

Referring now to FIG. 16. At block 1605, a network device receives a data packet and its label stack (e.g., label stack 1310). At block 1610, the network device pops each EEI label (e.g., EEI label 1312) from the top of the label stack until a topological label is detected. At block 1615, in response to detecting the EEI label, the network device excludes the EEI label and the service label immediately below it when determining the next hop of the data packet.

Figure 17:
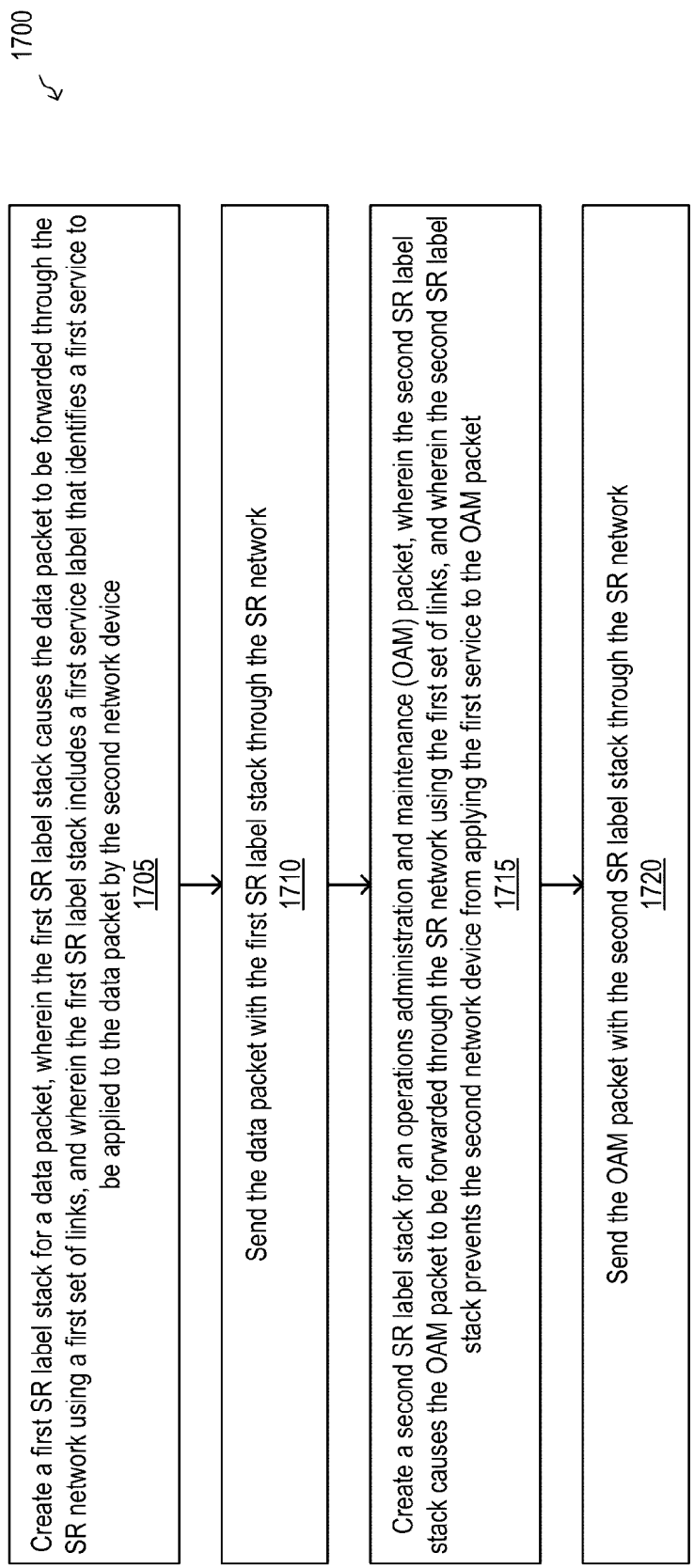
FIG. 17 is a flow diagram illustrating a method for creating label stacks according to one embodiment.

FIG. 17 is a flow diagram illustrating method 1700 for creating label stacks according to one embodiment. For example, method 1700 can be performed by network device 101 (e.g., label creator 110 of network device 101), which in one embodiment, is an ingress LSR. Method 1700 can be implemented in software, firmware, hardware, or any combination thereof.

Referring now to FIG. 17. At block 1705, a first network device creates a first SR label stack (e.g., label stack 310, 810, or 1310) for a data packet, wherein the first SR label stack causes the data packet to be forwarded through the SR network (e.g., network 100) using a first set of links (e.g., links 112 and 115), and wherein the first SR label stack includes a first service label (e.g., service label 313, 813, or 1313) that identifies a first service to be applied to the data packet by the second network device (e.g., network device 102).

At block 1710, the first network device sends the data packet with the first SR label stack through the SR network. At block 1715, the first network device creates a second SR label stack (e.g., label stack 320, 820, or 1320) for an operations administration and maintenance (OAM) packet, wherein the second SR label stack causes the OAM packet to be forwarded through the SR network using the first set of links, and wherein the second SR label stack prevents the second network device from applying the first service to the OAM packet. At block 1720, the first network device sends the OAM packet with the second SR label stack through the SR network.

An electronic device or a computing device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Next hop selection by the routing system for a given destination may resolve to one path (that is, a routing protocol may generate one next hop on a shortest path); but if the routing system determines there are multiple viable next hops (that is, the routing protocol generated forwarding solution offers more than one next hop on a shortest path—multiple equal cost next hops), some additional criteria is used—for instance, in a connectionless network, Equal Cost Multi Path (ECMP) (also known as Equal Cost Multi Pathing, multipath forwarding and IP multipath) (RFC 2991 and 2992) may be used (e.g., typical implementations use as the criteria particular header fields to ensure that the packets of a particular packet flow are always forwarded on the same next hop to preserve packet flow ordering). For purposes of multipath forwarding, a packet flow is defined as a set of packets that share an ordering constraint. As an example, the set of packets in a particular TCP transfer sequence need to arrive in order, else the TCP logic will interpret the out of order delivery as congestion and slow the TCP transfer rate down.

A Layer 3 (L3) Link Aggregation (LAG) link is a link directly connecting two NDs with multiple IP-addressed link paths (each link path is assigned a different IP address), and a load distribution decision across these different link paths is performed at the ND forwarding plane; in which case, a load distribution decision is made between the link paths.

Some portions of the preceding detailed descriptions have been presented in terms of algorithms and symbolic representations of transactions on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of transactions leading to a desired result. The transactions are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general-purpose systems may be used with programs in accordance with the teachings herein, or it may prove convenient to construct more specialized apparatus to perform the required method transactions. The required structure for a variety of these systems will appear from the description above. In addition, embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

Throughout the description, embodiments of the present invention have been presented through flow diagrams. It will be appreciated that the order of transactions and transactions described in these flow diagrams are only intended for illustrative purposes and not intended as a limitation of the present invention. One having ordinary skill in the art would recognize that variations can be made to the flow diagrams without departing from the broader spirit and scope of the invention as set forth in the following claims.

What is claimed is:

1. A method in a first network device that is communicatively coupled to a second network device in a segment routing (SR) network, the method comprising:
    creating a first SR label stack for a data packet, wherein the first SR label stack causes the data packet to be forwarded through the SR network using a first set of links, and wherein the first SR label stack includes a first service label that identifies a first service to be applied to the data packet by the second network device;
    sending the data packet with the first SR label stack through the SR network;
    creating a second SR label stack for an operations administration and maintenance (OAM) packet by copying at least a part of the first SR label stack to the second SR label stack, wherein the second SR label stack, in response to copying the at least a part of the first SR label stack, causes the OAM packet to be forwarded through the SR network using the first set of links, and wherein the second SR label stack prevents the second network device from applying the first service to the OAM packet; and
    sending the OAM packet with the second SR label stack through the SR network.

2. The method of claim 1, wherein creating the second SR label stack comprises:
    copying the first SR label stack of the data packet to the second SR label stack of the OAM packet; and
    inserting a first pop indicator label on top of the first service label in the second SR label stack, wherein the first pop indicator label causes the second network device to pop the first service label from the second SR label stack without applying the first service to the OAM packet.

3. The method of claim 2, wherein inserting the first pop indicator label comprises:
    inserting an extended special purpose label (ESPL)-generic pop indicator (GPI) on top of the first service label in the second SR label stack, wherein the ESPL-GPI causes the second network device to pop the first service label from the second SR label stack without applying the first service to the OAM packet; and inserting an extension label (XL) on top of the ESPL-GPI, wherein the XL indicates that an ESPL is immediately below the XL in the second SR label stack.

4. The method of claim 2, wherein inserting the first pop indicator label comprises:

inserting a generic pop indicator (GPI) reserved label on top of the first service label in the second SR label stack, wherein the GPI reserved label causes the second network device to pop the first service label from the second SR label stack without applying the first service to the OAM packet.

5. The method of claim 1, wherein creating the second SR label stack comprises:

copying the first SR label stack of the data packet to the second SR label stack of the OAM packet; and setting a traffic class field of the first service label in the second SR label stack with a predetermined value to indicate that the first service label belongs to a SR label stack of an OAM packet, wherein the traffic class field with the predetermined value causes the second network device to pop the first service label from the second SR label stack without applying the first service to the OAM packet.

6. The method of claim 1, wherein:

creating the first SR label stack comprises inserting a first entropy exclusion indicator (EEI) label on top of the first service label in the first SR label stack, wherein the first EEI label causes the second network device to determine a link for the data packet without using the first service label in the first SR label stack; and creating the second SR label stack comprises copying the first SR label stack of the data packet to the second SR label stack of the OAM packet, without copying the first service label from the first SR label stack to the second SR label stack in order to prevent the second network device from applying the first service to the OAM packet.

7. The method of claim 6, wherein inserting the first EEI label comprises:

inserting an extended special purpose label (ESPL)-entropy exclusion indicator (EEI) on top of the first service label in the first SR label stack, wherein the ESPL-EEI causes the second network device to determine a link for the data packet without using the first service label in the first SR label stack; and inserting an extension label (XL) on top of the ESPL-EEI, wherein the XL indicates that an ESPL is immediately below the XL in the first SR label stack.

8. The method of claim 6, wherein inserting the first EEI label comprises:

inserting an EEI reserved label on top of the first service label in the first SR label stack, wherein the EEI reserved label causes the second network device to determine a link for the data packet without using the first service label in the first SR label stack.

9. A first network device that is communicatively coupled to a second network device in a segment routing (SR) network, the first network device comprising:

a set of one or more processors; and a non-transitory machine-readable storage medium containing code, which when executed by the set of one or more processors, cause the first network device to:

create a first SR label stack for a data packet, wherein the first SR label stack causes the data packet to be forwarded through the SR network using a first set of links, and wherein the first SR label stack includes a first service label that identifies a first service to be applied to the data packet by the second network device, send the data packet with the first SR label stack through the SR network, create a second SR label stack for an operations administration and maintenance (OAM) packet by copying at least a part of the first SR label stack to the second SR label stack, wherein the second SR label stack, in response to copying the at least a part of the first SR label stack, causes the OAM packet to be forwarded through the SR network using the first set of links, and wherein the second SR label stack prevents the second network device from applying the first service to the OAM packet, and send the OAM packet with the second SR label stack through the SR network.

10. The first network device of claim 9, wherein creating the second SR label stack comprises the first network device to:

copy the first SR label stack of the data packet to the second SR label stack of the OAM packet; and insert a first pop indicator label on top of the first service label in the second SR label stack, wherein the first pop indicator label causes the second network device to pop the first service label from the second SR label stack without applying the first service to the OAM packet.

11. The first network device of claim 10, wherein inserting the first pop indicator label comprises the first network device to:

insert an extended special purpose label (ESPL)-generic pop indicator (GPI) on top of the first service label in the second SR label stack, wherein the ESPL-GPI causes the second network device to pop the first service label from the second SR label stack without applying the first service to the OAM packet; and insert an extension label (XL) on top of the ESPL-GPI, wherein the XL indicates that an ESPL is immediately below the XL in the second SR label stack.

12. The first network device of claim 10, wherein inserting the first pop indicator label comprises the first network device to:

insert a generic pop indicator (GPI) reserved label on top of the first service label in the second SR label stack, wherein the GPI reserved label causes the second network device to pop the first service label from the second SR label stack without applying the first service to the OAM packet.

13. The first network device of claim 9, wherein creating the second SR label stack comprises the first network device to:

copy the first SR label stack of the data packet to the second SR label stack of the OAM packet; and set a traffic class field of the first service label in the second SR label stack with a predetermined value to indicate that the first service label belongs to a SR label stack of an OAM packet, wherein the traffic class field with the predetermined value causes the second network device to pop the first service label from the second SR label stack without applying the first service to the OAM packet.

14. The first network device of claim 9, wherein:

creating the first SR label stack comprises the first network device to insert a first entropy exclusion indicator (EEI) label on top of the first service label in the first SR label stack, wherein the first EEI label causes the second network device to determine a link for the data packet without using the first service label in the first SR label stack; and creating the second SR label stack comprises the first network device to copy the first SR label stack of the data packet to the second SR label stack of the OAM packet, without copying the first service label from the first SR label stack to the second SR label stack in order to prevent the second network device from applying the first service to the OAM packet.

15. The first network device of claim 14, wherein inserting the first EEI label comprises the first network device to:
insert an extended special purpose label (ESPL)-entropy exclusion indicator (EEI) on top of the first service label in the first SR label stack, wherein the ESPL-EEI causes the second network device to determine a link for the data packet without using the first service label in the first SR label stack; and
insert an extension label (XL) on top of the ESPL-EEI, wherein the XL indicates that an ESPL is immediately below the XL in the first SR label stack.

16. The first network device of claim 14, wherein inserting the first EEI label comprises the first network device to:
insert an EEI reserved label on top of the first service label in the first SR label stack, wherein the EEI reserved label causes the second network device to determine a link for the data packet without using the first service label in the first SR label stack.

17. A non-transitory computer-readable storage medium having computer code stored therein, which when executed by a processor of a first network device that is communicatively coupled to a second network device in a segment routing (SR) network, cause the first network device to perform operations comprising:
creating a first SR label stack for a data packet, wherein the first SR label stack causes the data packet to be forwarded through the SR network using a first set of links, and wherein the first SR label stack includes a first service label that identifies a first service to be applied to the data packet by the second network device;
sending the data packet with the first SR label stack through the SR network;
creating a second SR label stack for an operations administration and maintenance (OAM) packet by copying at least a part of the first SR label stack to the second SR label stack, wherein the second SR label stack, in response to copying the at least a part of the first SR label stack, causes the OAM packet to be forwarded through the SR network using the first set of links, and wherein the second SR label stack prevents the second network device from applying the first service to the OAM packet; and
sending the OAM packet with the second SR label stack through the SR network.

18. The non-transitory computer-readable storage medium of claim 17, wherein creating the second SR label stack comprises:
copying the first SR label stack of the data packet to the second SR label stack of the OAM packet; and
inserting a first pop indicator label on top of the first service label in the second SR label stack, wherein the first pop indicator label causes the second network device to pop the first service label from the second SR label stack without applying the first service to the OAM packet.

19. The non-transitory computer-readable storage medium of claim 18, wherein inserting the first pop indicator label comprises:
inserting an extended special purpose label (ESPL)-generic pop indicator (GPI) on top of the first service label in the second SR label stack, wherein the ESPL-GPI causes the second network device to pop the first service label from the second SR label stack without applying the first service to the OAM packet; and
inserting an extension label (XL) on top of the ESPL-GPI, wherein the XL indicates that an ESPL is immediately below the XL in the second SR label stack.

20. The non-transitory computer-readable storage medium of claim 18, wherein inserting the first pop indicator label comprises:
inserting a generic pop indicator (GPI) reserved label on top of the first service label in the second SR label stack, wherein the GPI reserved label causes the second network device to pop the first service label from the second SR label stack without applying the first service to the OAM packet.

21. The non-transitory computer-readable storage medium of claim 17, wherein creating the second SR label stack comprises:
copying the first SR label stack of the data packet to the second SR label stack of the OAM packet; and
setting a traffic class field of the first service label in the second SR label stack with a predetermined value to indicate that the first service label belongs to a SR label stack of an OAM packet, wherein the traffic class field with the predetermined value causes the second network device to pop the first service label from the second SR label stack without applying the first service to the OAM packet.

22. The non-transitory computer-readable storage medium of claim 17, wherein:
creating the first SR label stack comprises inserting a first entropy exclusion indicator (EEI) label on top of the first service label in the first SR label stack, wherein the first EEI label causes the second network device to determine a link for the data packet without using the first service label in the first SR label stack; and
creating the second SR label stack comprises copying the first SR label stack of the data packet to the second SR label stack of the OAM packet, without copying the first service label from the first SR label stack to the second SR label stack in order to prevent the second network device from applying the first service to the OAM packet.

23. The non-transitory computer-readable storage medium of claim 22, wherein inserting the first EEI label comprises:
inserting an extended special purpose label (ESPL)-entropy exclusion indicator (EEI) on top of the first service label in the first SR label stack, wherein the ESPL-EEI causes the second network device to determine a link for the data packet without using the first service label in the first SR label stack; and
inserting an extension label (XL) on top of the ESPL-EEI, wherein the XL indicates that an ESPL is immediately below the XL in the first SR label stack.

24. The non-transitory computer-readable storage medium of claim 22, wherein inserting the first EEI label comprises:
    inserting an EEI reserved label on top of the first service label in the first SR label stack, wherein the EEI reserved label causes the second network device to determine a link for the data packet without using the first service label in the first SR label stack.

\* \* \* \* \*